(No Model.) 4 Sheets—Sheet 1.
J. H. COON.
WIRE BARBING MACHINE.
No. 244,554. Patented July 19, 1881.
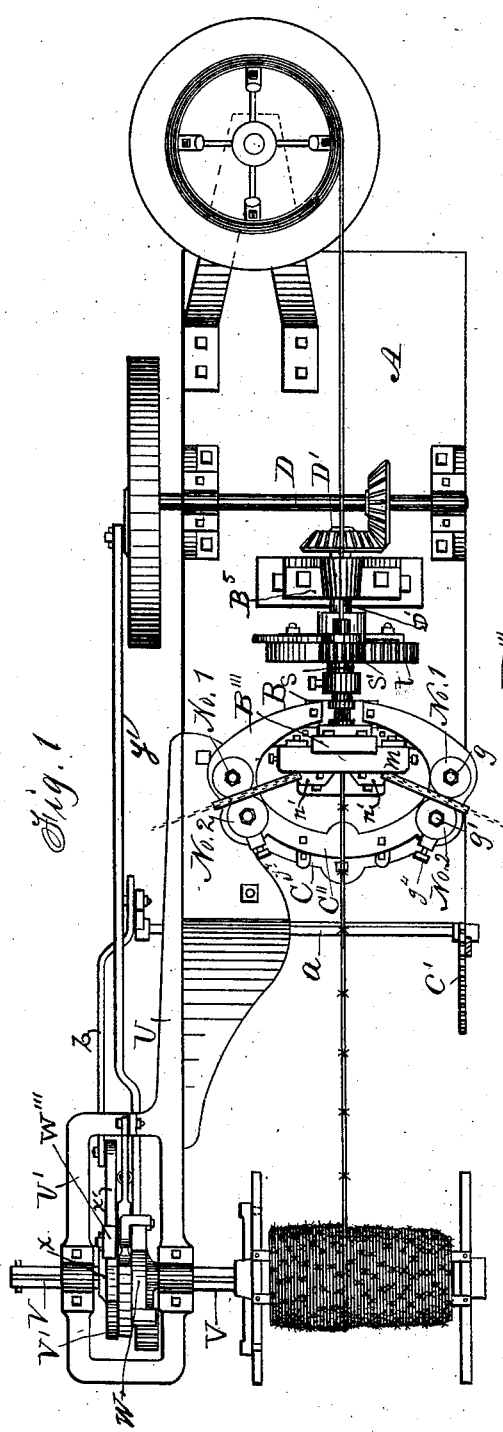
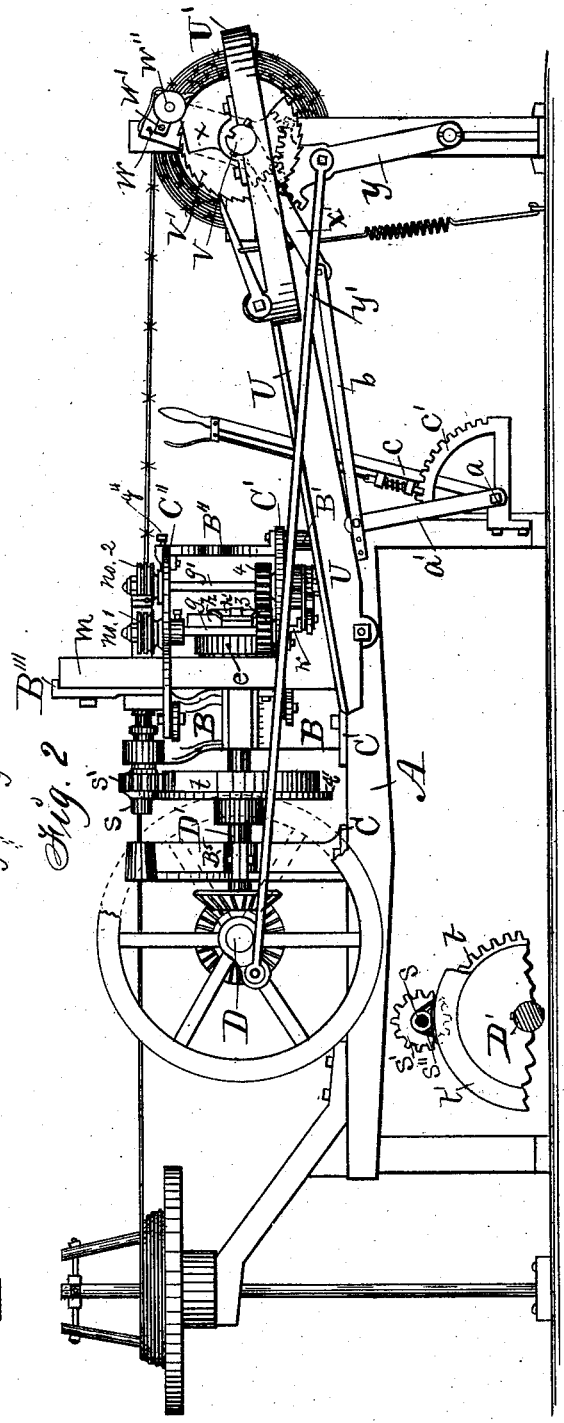
Witnesses:
R. S. Orwig
Frank W. Geers
Inventor: James H. Coon,
By Thomas G. Orwig, Att'y.

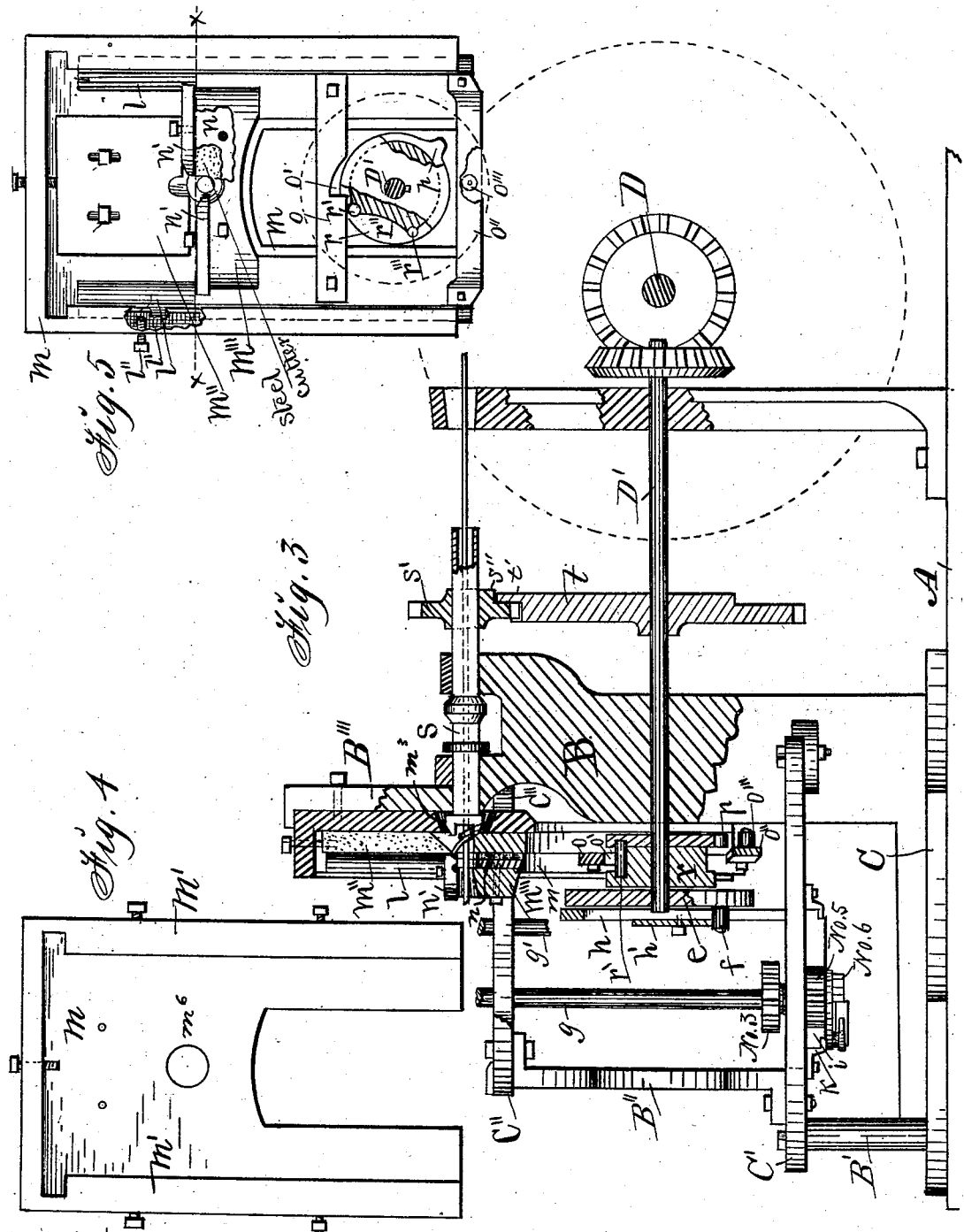

(No Model.) 4 Sheets—Sheet 3.
J. H. COON.
WIRE BARBING MACHINE.
No. 244,554. Patented July 19, 1881.
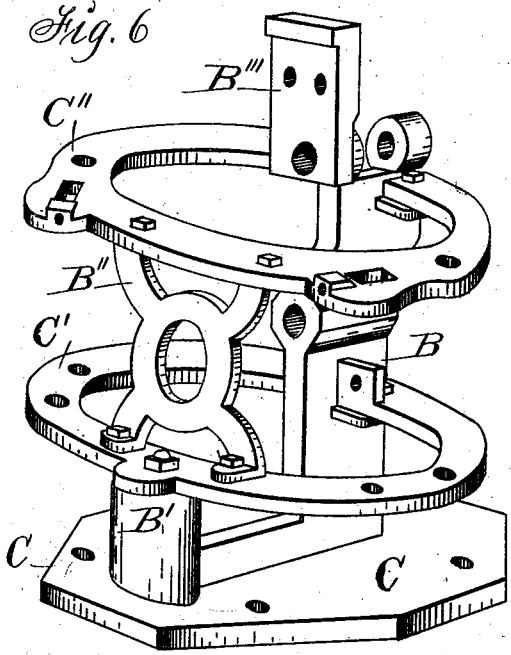
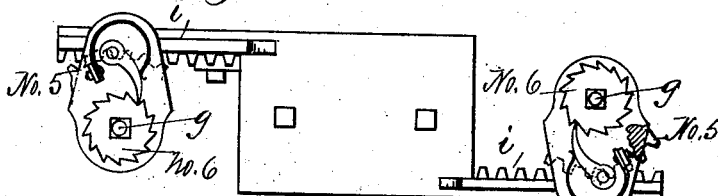
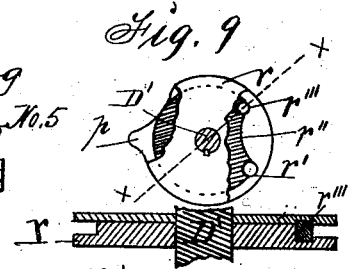
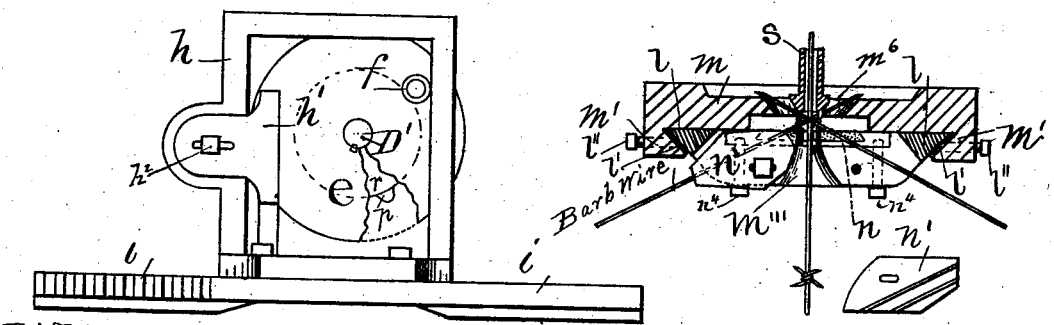
Witnesses:
R. G. Orwig
Frank W. Hers.
Inventor:
James H. Coon,
By Thomas G. Orwig, Attorney

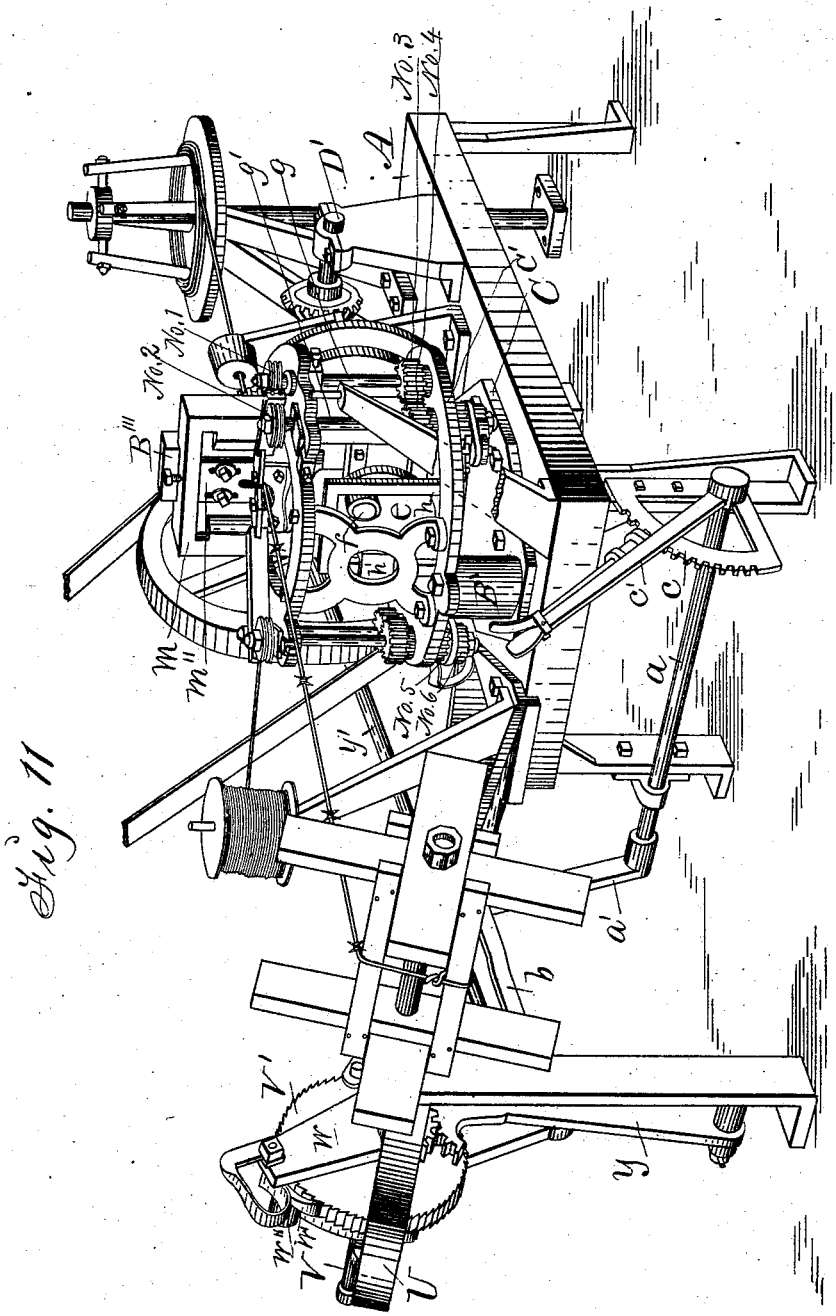

UNITED STATES PATENT OFFICE.

JAMES H. COON, OF DES MOINES, IOWA.

WIRE-BARBING MACHINE.

SPECIFICATION forming part of Letters Patent No. 244,554, dated July 19, 1881.

Application filed January 3, 1881. (No model.)

*To all whom it may concern:*

Be it known that I, JAMES H. COON, of Des Moines, in the county of Polk and State of Iowa, have invented an Improved Wire-Barbing Machine, of which the following is a specification.

My invention relates to that class of machines in which a fence wire or cable is moved longitudinally from a reel at one end to a spool at the opposite end, and barb-wires are fed from opposite sides thereof at regular intervals of time to be cut into barb pieces to be wrapped upon the fence-wire at regular intervals of space to produce four-pointed barbs.

It consists, first, in forming a skeleton-base specially adapted for supporting barb-feeding, barb-cutting, and barb-wrapping mechanisms advantageously in the relative positions required to coact in forming and applying fence-barbs to fence-wire; second, in combining an adjustable wire-guide with a barb-cutter to regulate the length of the projecting end of the barb; third, in combining anti-friction rollers at the projecting points through which pressure is applied to the cutters to relieve the cam from undue friction occasioned by impact upon those points; fourth, in forming a cam integral with a pinion to engage a flange on a mutilated gear-wheel for the purpose of holding the barb-wrapping mechanism stationary at intervals while the fence-wire and barb-wires are being advanced, all as hereinafter fully set forth.

Figure 1 of my accompanying drawings is a top view of my machine. Fig. 2 is a side view. Fig. 3 is an enlarged sectional side view of my skeleton-base, showing the relative positions of the barb-feeding, barb-cutting, and barb-wrapping mechanisms combined therewith. Fig. 4 is a front-face view of an auxiliary frame, by means of which the barb-feeding and barb-cutting mechanisms are detachably connected with my skeleton-frame; and Fig. 5 is a corresponding view, showing parts of the operative devices attached to the auxiliary frame. Fig. 6 is a perspective view of my skeleton-frame. Fig. 7 is a detail view, showing the under side of the double rack and its position relative to the shafts that operate the feed-rollers. Fig. 8 is a side view, showing the double rack combined with a frame that carries an adjustable cam to engage a roller-stud projecting from the face of a revolving disk, as required, to actuate the feed-rollers and regulate the advance of the barb-wires. Fig. 9 is a face view of my cam-wheel that has anti-friction rollers in its periphery. Fig. 10 is a transverse section of the auxiliary frame shown in Figs. 4 and 5, and shows the position of my adjustable wire-guides relative to the barb-cutting and barb-forming devices. One of the wire-guides is shown detached and in an inverted position. Fig. 11 is a perspective view of my complete machine.

A represents the frame and stand of my machine. It may be made of wood, fixed or portable, and vary in height, as desired.

B is the main vertical portion of my skeleton-base. Its bottom C is a flat plate, adapting it to be placed upon the front and center of the stand A, to be firmly fixed thereto by means of bolts. From the front end of the plate C, and cast integral therewith, is a minor vertical portion, B', adapted to form a rest for the horizontal pieces of the complete frame. C' is a casting of elliptical shape, open at its rear side, and adapted to have its ends abut and rest against the sides of the main vertical portion, B, to be fastened thereto by means of bolts. Its front and closed side rests upon the top of the minor vertical portion, B', to which it is fixed by means of a screw-bolt.

C'' is a casting corresponding in form with C'. Its rear side and ends are fitted and fixed to the top portion of the vertical part B, and its front side is connected with and supported by the lower casting, C', by means of an intermediate post, B'', that is secured in its place by means of bolts.

D is a driving-shaft mounted in suitable bearings attached to the stand A. It is placed in a transverse and also elevated position relative to the stand, and in rear of my skeleton-base, designed to support the wire-feeding, barb-cutting, and barb-wrapping mechanisms.

D' is a driving-shaft placed in a right-angled position relative to the shaft D, and connected therewith by means of miter-gearing. The front end of the shaft D' rests in a bearing formed in or attached to the vertical portion B of the skeleton-base, and its rear end in a bearing, $B^5$, that rises from the stand A.

$e$ (shown in Figs. 3, 8, and 11) is a disk on the front of the shaft D'.

$f$ is a stud-roller projecting laterally from the disk $e$ to engage an adjustable cam, as shown in Fig. 8, to impart rectilinear motion to the double rack, and thereby rotary motion to the feed-rollers at regular intervals.

Nos. 1 and 2 represent feed-rollers mounted on each side and at the top of my skeleton-frame. The rollers No. 1 are fixed to the top ends of shafts $g$, that have their bearings formed in or attached to the horizontal portions C' and C'' of the frame. The rollers No. 2 are fixed to the top ends of corresponding shafts, $g'$, that have adjustable bearings at their top ends, as at $g^4$, Fig. 1, as is common, to regulate the friction of the feed-rollers in engaging and moving the barb-wires relative to the cutters and the fence-wire.

Nos. 3 and 4 are mating gear-wheels fixed to the lower portions of the shafts $g$ and $g'$.

No. 5 represents a toothed sector placed loosely on the lower end of the shaft $g$, to engage my double rack, and to convert the rectilinear motion of the rack into rotary motion and transmit it at regular intervals to the feed-rollers by means of a ratchet-wheel, No. 6, fixed to said shaft $g$, and pawls and springs carried on the sector, and by means of the shafts $g$ and $g'$ and their fixed gear-wheels Nos. 3 and 4, as required, to advance the barb-wires from spools mounted on suitable bearers fixed to or near the stand A.

$h$ (shown in Figs. 8 and 11) is a rectangular frame fixed in a vertical position to the double rack $i\ i$, to perform the function of a cam.

$h'$ is an adjustable cam, or a side of the complete cam. It has a slot through which a set-screw, $h^2$, is passed into the frame $h$ to clamp the two parts rigidly together. By adjusting the part $h'$ relative to the part $h$ and the stud-roller $f$ on the disk $e$ the length of the throw of the combined frame $h$ and double rack $i\ i$ is readily regulated as required to govern the intermittent motions of the feed-rollers, and thereby the lengths of the barb-pieces prior to their being wrapped upon the fence-wire.

$k$ (shown in Fig. 3) is one of a pair of brackets or rack-bearers, fixed to the under side of the lower horizontal portion of my skeleton-frame, to support the double rack $i\ i$.

$m$ (shown in full by Fig. 4 on Sheet No. 2) is an auxiliary frame designed to be detachably connected with the top portion of the vertical portion B of the skeleton-frame by means of an extension, B''', that is formed integral with the part B, and bolts, as shown in Figs. 1, 2, 3, and 11. It has flanged sides $m'$, that form bearings for the moving parts of the barb-cutting mechanism.

$m''$ is a steel plate bifurcated at its lower end to stride the fence-wire and to form two cutters differing in length, as required, to cut off the barb-wires, one of which barb-wires is advanced under the fence-wire and the other over the top. The bifurcated knife $m''$ is adjustably connected with the top portion of the panel in the frame $m$ by means of screw-bolts, to facilitate sharpening whenever it becomes dull.

$m'''$ is the cross-piece of a casting and cutter carrier in the form of a letter H. It corresponds in size with the panel formed in the face of the frame $m$, and its sides $l$ are beveled to fit against the sides and bearings $m'$.

$l'$ represents strips of metal packing placed between the cutter-carrier $m'''$ and the bearings $m'$ in such a manner that they can be readily adjusted, by means of set-screws $l''$, to govern the friction and compensate for wear.

$n$ (shown in Fig. 5 on Sheet No. 2, and also in a cross-section view, Fig. 10 on Sheet No. 3, taken through and looking downward from line $xx$ of said Fig. 5) is a metal block fitted in a recess of corresponding size and shape formed in the rear side of the cross-piece $m'''$. Its function is to carry a steel cutter that engages the under sides of the barb-wires to aid in cutting off barb-pieces. The block $n$, carrying the cutter, is detachably secured to the cross-piece $m'''$ by means of screw-bolts passed inward through the cross-piece, as required, for the purpose of removing and sharpening the cutter when it becomes worn.

$n'$ are wire-guides adjustably connected with the top faces of the cross-piece $m'''$ by means of set-screws, as shown in Figs. 5 and 10, for the purposes of directing the barb-wires relative to the cutters and regulating the length of the projecting ends of the barbs. By moving the guides and making their angles more obtuse relative to the fence-wire that passes between them, in an opening $m^6$ in the frame $m$, the barb-wire is thereby moved inward relative to the cutters and the length of the barbs is diminished. By a reverse movement the length is increased. By making perforations or grooves through the guides at different angles to direct the wire the same results may be obtained by changing the barb-wires from one perforation or groove to another without adjusting the guides.

$o$ is a cross-bar bolted to the sides $l$ of the H-shaped cutter-carrier at a point below the cross-piece $m'''$. It has a notch, $o'$, in its under side, that adapts it to perform the function of a cam in operating the cutters carried by the H-shaped cutter-carrier.

$o''$ is a bent cross-bar bolted to the lower ends of the sides $l$ of the cutter-carrier. It has an anti-friction roller, $o'''$, on a stud projecting inward from its center, to engage a cam, $p$, formed on the periphery of the inner flange of the cam $r$, carried on the end of the rotating shaft D'. By means of this stud and roller $o'''$ and the cam $p$ a downward motion is imparted to the H-shaped cutter-carrier at every revolution of the shaft D'.

$r$ (shown in Figs. 3, 5, and 9) is a cam-wheel, of peculiar construction, fixed to the shaft D' and against the disk $e$, for the purpose of imparting an upward motion to the cutter-carrier at each revolution of the shaft D'.

$r'$ is a steel roller journaled to the periphery of the wheel *r* by means of detachable flanges on the side of the wheel, as shown by Fig. 9, and an enlarged cross-section thereof immediately below it, taken through the inclined line *x x* of said Fig. 9, or in any suitable way, in such a manner that the roller will project outward and engage the under surface of the bar *o* at each revolution of the wheel *r*, as required, to complete the upward motion of the cutter-carrier, and thereby cut off the barb-pieces after they have been wrapped around the fence-wire. The roller *r'*, thus placed at the precise point where the greatest pressure occurs on the cam-wheel, prevents friction, binding, and wear, and facilitates the movements of the actuating parts. When the upward movement of the cutter-carrier is completed the roller *r'* enters the notch *o'* in the bar *o*, as required, to allow the cutter-carrier to descend, as required, to open the passage through which the barbed fence-wire is advanced. A concave, *r''*, in the periphery of the wheel *r* allows the bar *o* and the cutter-carrier further descent. A roller, *r'''*, at the end of said concave, facilitates the movements of the actuating parts and prevents friction, binding, and wear.

*s* is a tubular shaft mounted immediately over the driving-shaft D'. It extends forward through bearings in the vertical portion B of the skeleton-frame, and terminates in a barb-wrapping device contiguous to the barb-cutters, as required, to engage the barb-wires and wrap them upon the fence-wire before the barb-pieces are cut off by the cutting mechanism.

*s'* is a pinion fixed on the rear end of the shaft *s*. It has a shoulder or cam, *s''*, formed integral therewith on its side face, to engage a flange on a driver-wheel, as shown in a detail view on the under side of Fig. 2, for the purpose of holding the shaft *s* stationary while the barb-pieces are being cut off and the fence-wire advanced.

*t* is the driver-wheel that engages the pinion *s'* on the tubular shaft *s*. It is in the form of a mutilated gear-wheel that has a flange, *t'*, extending partly around its periphery. It is fixed to the driving-shaft D', and each revolution thereof revolves the combined pinion and shaft *s s'* one or more times, as required, to cause the barb-wrapping head on the opposite end of the shaft *s* to carry the barb-wires around the fence-wire. The number of revolutions is governed by the size of the pinion *s'* and the length of the toothed segment of the gear-wheel *t*, and before the revolution of the wheel *t* is completed its flange *t'* engages the crescent-shaped cam *s''* on the pinion *s'*, as required, to hold the combined pinion and shaft *s s'* stationary at intervals, to allow the cutting mechanism to sever the barbs from the barb-wires and the wire-moving and barb-spacing mechanism to advance the fence-wire.

U is a cast metal bracket of peculiar form, adapted to be fixed to the front end of the stand A and my skeleton-frame B C, by means of bolts, for the purpose of supporting wire-moving and barb-spacing mechanism. It inclines upward and outward from the stand A and terminates in a frame, U', of quadrilateral shape, within which the operative devices are mounted.

V is a driver-shaft and spool-carrier mounted in bearings formed in the sides of the frame U'. It has a longitudinal groove, by means of which a ratchet-wheel, V', having a corresponding stud in its bore, is attached to the shaft in such a manner that it will allow the shaft to slide longitudinally for the purpose of shifting the spool carried on its opposite end relative to the barb-wrapping tubular shaft *s*, as required, to regulate the winding of the barbed wire evenly upon the spool in successive rounds from one end of the spool to the other.

*w* is a lever that has a toothed sector at its lower end, and is mounted loosely on the shaft V and inside of the ratchet-wheel V'. It carries a pawl, *w'*, at its top end, to engage the ratchet-wheel. The pawl carries an anti-friction roller, *w''*, to engage a cam, *x*, mounted on the outside of the ratchet-wheel.

*x'* is an arm extending downward from the cam *x*.

*y* is a lever pivoted to a post that is fixed under the frame U'. A toothed sector on the upper end of the lever *y* engages the toothed sector on the lower end of the lever *w*.

*y'* is a pitman that connects the lever *y* with a crank-pin on the driving-wheel, by means of which motion is transmitted at each revolution of the wheel to the shaft V and the spool thereon through the medium of the levers *y* and *w*, the ratchet-wheel V', and the pawl *w''*.

*a* is a rock-shaft mounted in bearings attached to the legs of the stand A.

*a'* is an arm and crank fixed to the end of the shaft *a*, and connected with the end of the arm *x'*, extending from the cam *x*, by means of a rod or bar, *b*.

*c* is a lever-handle fixed to the opposite end of the shaft *a*.

*c'* is a segmental rack combined with the shaft-bearing. By means of a bolt carried on the handle *c* the handle is readily locked to the rack, as required, to hold the shaft *a* and the cam *x* stationary. To adjust the cam *x* relative to the ratchet-wheel V', and thereby regulate the movement of the ratchet-wheel relative to the regular strokes of the lever *w*, I simply move the handle *c* relative to the rack *c'*. When the cam *x* is thus set toward the lever *w* the roller *w''* engages the cam more quickly and lifts the pawl *w'* from the ratchet-wheel sooner at each forward motion of the lever to restrict the revolving motion of the combined ratchet-shaft and spool, as required, to regulate the movement of the fence-wire, and the spaces between the barbs fixed thereon, at each revolution of the driving-wheel. As the coils of wire enlarge on the spool its periodical partial revolutions must be diminished to retain uniformity in the movement of the fence-wire and the spacing between the barbs, and by simply adjusting the cam-wheel $x$ at intervals such movement and spacing is readily controlled.

From the detailed descriptions of the various parts of my machine and their relative positions and functions their unitary operations and results are obvious.

I claim as my invention—

1. In a machine for barbing fence-wire, the skeleton-frame composed of the castings B B', having a flat and extended base, C, the elliptical-shaped castings C' and C'', and the post B'', substantially as shown and described, for the purposes specified.

2. The rotarily-adjustable and grooved or perforated wire-guides $n'$, in combination with barb-cutters to adjust the barb-wires relative to the fence-wire and the cutting-edges of the cutters in the manner set forth, for the purpose of regulating the length of the barbs.

3. The cam-wheel $r$, having a concave space, $r''$, and anti-friction rollers $r'$ and $r'''$, in combination with the bar $o$, having a notch, $o'$, and fixed to a cutter-carrier for the purpose of operating barb-cutters at regular intervals, in the manner specified.

4. The flanged cam-wheel $r$, having a cam, $p$, in combination with the H-shaped cutter-carrier having a bar, $o'''$, and carrying an anti-friction roller or stud, $o''''$, substantially as shown and described, to impart downward motions to the cutter-carrier at regular intervals, for the purposes specified.

5. The detachable frame $m\ m'\ m'''$, carrying a cutter, the adjustable cutters $m''$, and the H-shaped cutter-carrier $m'''$, arranged and combined substantially as shown and described, for the purposes specified.

6. The detachable frame $m\ m'$, adapted to carry barb-cutting mechanism, in combination with the skeleton-frame B B' B'' C C' C'', having an extension, B''', substantially as shown and described, for the purposes specified.

7. The pinion $s'$, having a cam, $s''$, on its side face, in combination with a mutilated gear-wheel having a flange extending around a portion of its periphery, for the purposes set forth.

8. The bracket U, having the quadrilateral frame U' formed integral with its end, the shaft V, the ratchet-wheel V', the cam $x$, the lever $w$, having a toothed sector on its lower end and carrying a pawl, $w'$, and roller $w''$ at its top end, and the pivoted lever $y$, having a toothed sector at its top end, arranged and combined substantially as shown and described, for the purposes specified.

JAMES H. COON.

Witnesses:
R. G. ORWIG,
FRANK W. HEERS.